United States Patent

Gibbs et al.

[15] 3,641,851

[45] Feb. 15, 1972

[54] PIPE-CUTTING APPARATUS

[72] Inventors: James W. Gibbs, 8027 West 14th Ave.; John L. Gibbs, 14820 Miami Lakeway East, both of Hialeah, Fla. 33014

[22] Filed: Oct. 13, 1969

[21] Appl. No.: 865,767

[52] U.S. Cl. ..................................82/73, 82/70.2, 82/4 C, 82/101
[51] Int. Cl. ..........................................B23b 5/14
[58] Field of Search ...............82/70.2, 73, 62, 46, 4 C, 101

[56] References Cited

UNITED STATES PATENTS 1,715,872    6/1929    Stevens..................................82/70.2

FOREIGN PATENTS OR APPLICATIONS 1,118,597    3/1956    France......................................82/46

*Primary Examiner*—Leonidas Vlachos
*Attorney*—John Cyril Malloy

[57] ABSTRACT

Apparatus for transversely cutting and severing lengths of pipe or rod work stock material and having a tubular frame adapted to endwise receive a length of pipe stock to be cut. A plurality of clamping jaw assemblies is stationarily supported in radial arrangement on the tubular frame and provides spring-loaded jaw means radially projecting into the tubular frame interior for clamping and centering the pipe work stock in the tubular frame. A cutter head having radially arranged cutter jaw assemblies is supported on one end of the tubular frame and is rotatingly driven to form a groove around the pipe wall for severing the pipe stock at the grooved portion. A crowder element having frustoconical interior cam surface means is movably mounted concentrically on the tubular frame and is adapted for translational movement longitudinally of the frame. Movement of the crowder element in one direction is operative through the frustoconical cam surface means thereof for simultaneously causing radial endward movement of the plurality of clamping jaws and the plurality of cutting jaws for respectively clamping and cutting the pipe stock material. Movement of the crowder element in the opposite direction is operative for causing radial outward movement of the plurality of clamping and cutting jaws and for releasing the pipe stock from the tubular frame of the cutting apparatus.

6 Claims, 6 Drawing Figures

INVENTOR
JAMES W. GIBBS
JOHN L. GIBBS
BY John Cyril Malloy
ATTORNEY

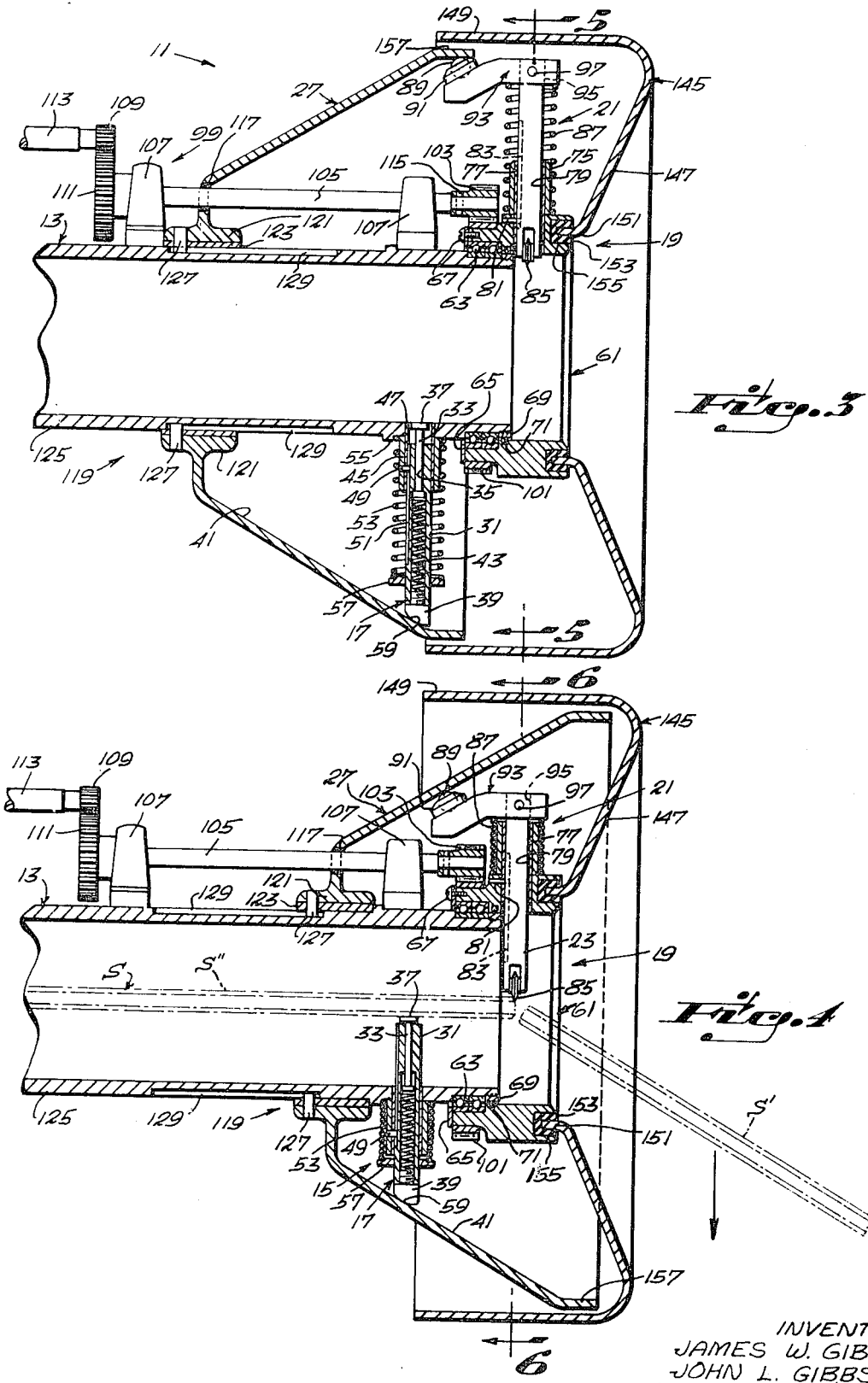

PATENTED FEB 15 1972

INVENTOR
JAMES W. GIBBS
JOHN L. GIBBS

BY John Cyril Mallory
ATTORNEY.

3,641,851

PIPE-CUTTING APPARATUS

DESCRIPTION OF THE PRIOR ART

1. Field of the Invention

The invention relates to pipe and rod cutting apparatus generally and relates particularly to heavy duty production-type pipe-cutting machines having self-centering clamping chuck means and self-centering power operative pipe-cutting blade elements.

2. Description of the Prior Art

Heretofore, in the operation of the typical heavy duty production type pipe-cutting machine, a length of pipe stock was centered and clamped by the clamping chuck means of the pipe-cutting apparatus and then was transversely severed by radial actuation of a set of cutter blades mounted on a rotatingly driven cutter head. Typically, the clamping and cutting actions were separate and sequential and required considerable skill and practice on the part of the operator of the pipe-cutting machine. Moreover, sequentially clamping and cutting the pipe work stock for each pipe cut restricted the output or production of a machine. A problem of particular import in the design and operation of a typical pipe-cutting machine is the problem of providing uniform equidistant radial cutting movement of the radially arranged cutting blades while the blades are being rotated about the pipe work stock. Typically, the blades on a rotating cutter head may be fed radially inwardly and outwardly by actuation of a so-called scrowl element mounted on the cutter head and other such cutter blade-actuating mechanism of complicated design and construction.

SUMMARY OF THE INVENTION

The pipe-cutting apparatus of the instant invention includes means substantially simultaneously operative for clamping and cutting a length of pipe work stock. A crowder element of frustoconical configuration is adapted to substantially simultaneously engage a plurality of radially arranged cutting and clamping elements; the crowder element actuating mechanism includes a single crowder lever operative respectively for simultaneously moving the pipe clamping and cutting jaw means of the apparatus radially inwardly or outwardly respective to extended or retracted configuration respectively for cutting and clamping a length of pipe stock or for releasing the pipe stock from the pipe-cutting apparatus. The invention provides a heavy duty, motor-operative, high capacity pipe-cutting machine operative for quickly, consistently, accurately cutting pipe or rod material. The machine is easy to operate and requires negligible skill or practice to operate proficiently. It is of substantially mechanically simple design and construction and does not include complicated or intricate parts subject to malfunction; it requires minimum repair and maintenance.

BRIEF DESCRIPTION OF THE DRAWING

FIG. 3 is a vertical plane, longitudinal, sectional view taken as on the line 3—3 of FIG. 2;

FIG. 4 is a view, similar to FIG. 3, but illustrating the clamping and cutting jaw units in radially closed configuration;

DESCRIPTION OF THE PREFERRED EMBODIMENT

Figure 1:
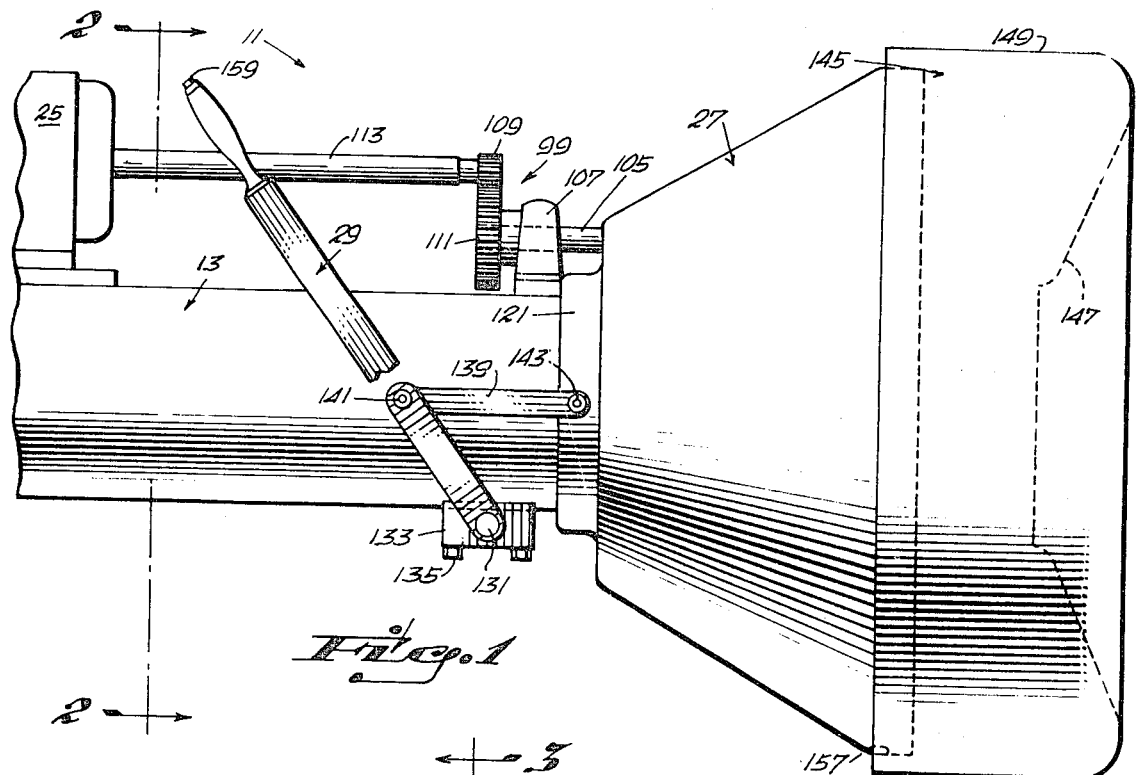
FIG. 1 is a side elevational view of the pipe-cutting apparatus of the instant invention with the crowder-actuating lever moved rearwardly and the pipe clamping and cutting jaw units (not shown) arranged in radially open disposition.
Figure 2:
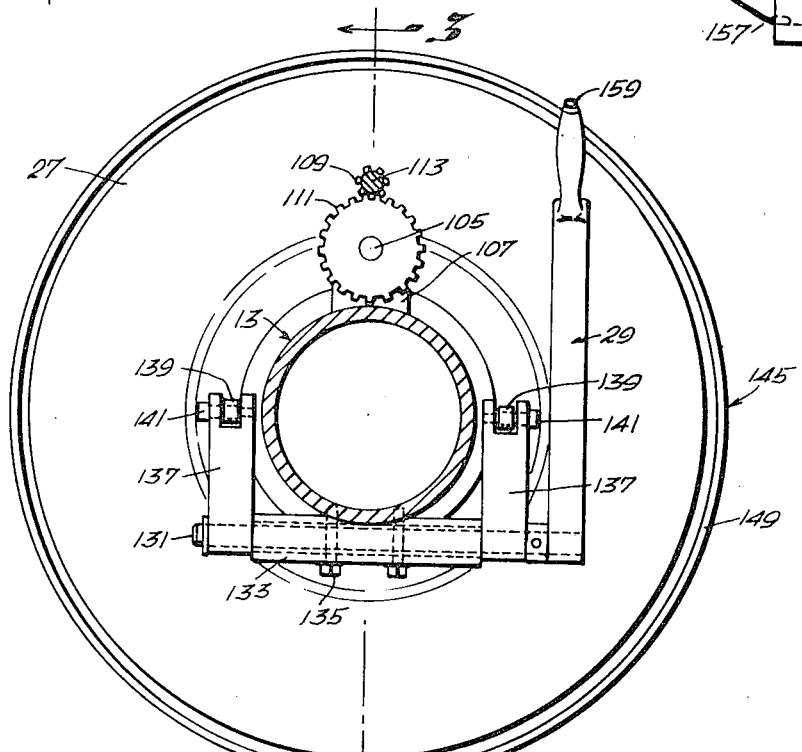
FIG. 2 is a vertical plane, transverse, sectional view taken as on the line 2—2 of FIG. 1 and further illustrating the crowder-actuating mechanism.
Figure 5:
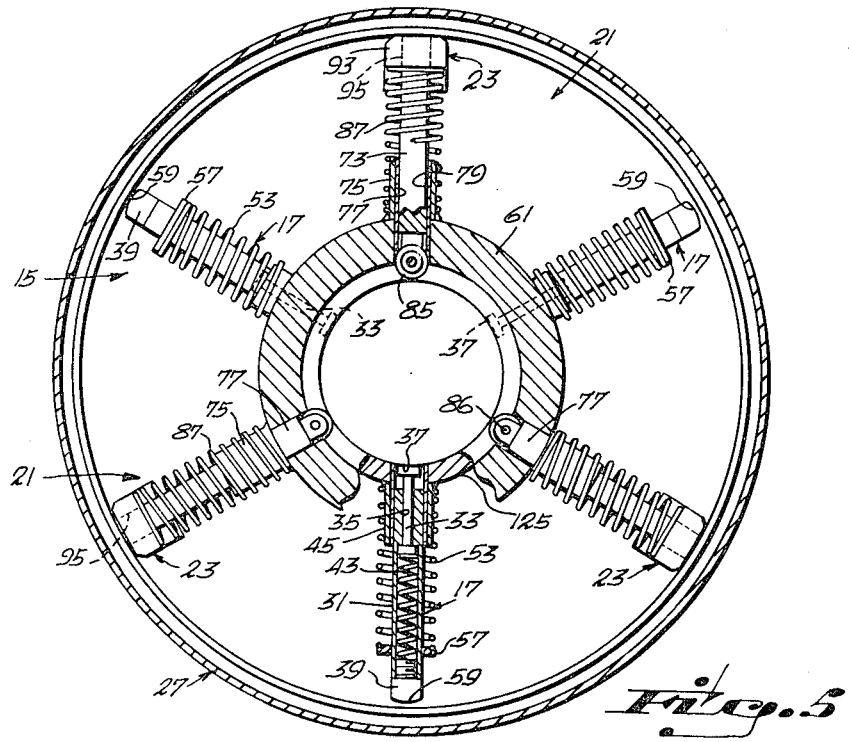
FIG. 5 is a vertical plane, transverse, sectionalized view taken as on the line 5—5 of FIG. 3.
Figure 6:
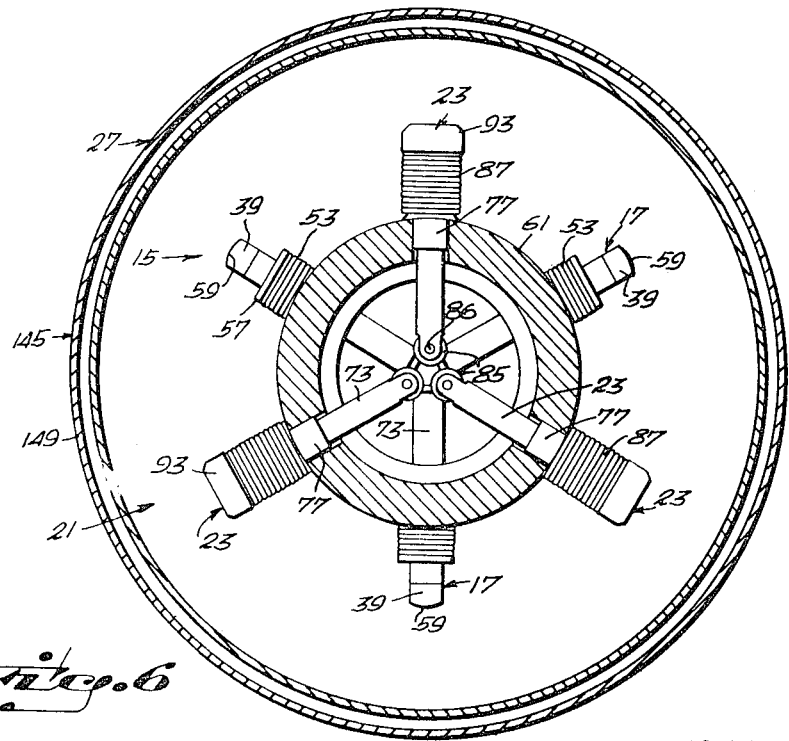
FIG. 6 is a vertical plane, transverse, sectionalized view taken as on the line 6—6 of FIG. 4.

The pipe-cutting apparatus of the instant invention is indicated generally by the numeral 11 and basically includes a tubular frame 13; a plurality of pipe-clamping jaw assemblies 15 stationarily supported in radial arrangement concentrically on tubular frame 13 and having respectively pipe-clamping jaw units 17; a cutter head 19 rotatingly concentrically supported on one end of tubular frame 13 and including a plurality of radially arranged cutting jaw assemblies 21 having respectively pipe cutting jaw units 23; motor means 25 adapted for drivingly rotating cutter head 19; a frustoconical crowder element 27 concentrically movably supported on tubular frame 13 and operative in translational movement for radially actuating clamping and cutting jaw units 17, 23; and selectively operated crowder lever means 29 operative for causing translational movement of crowder element 27 and pipe clamping and cutting actions respectively by jaw assemblies 15, 23.

Each pipe clamping jaw unit 17 preferably includes a base element 31 and plunger element 33 coaxially telescopically fitted together and operative through expansive-contractive movement thereof for varying the effective length of each pipe cutting jaw unit. Plunger element 33 is freely fitted in an axial aperture 35 formed in base element 31 and includes an end portion defining a clamping surface 37 adapted for clampingly engaging the outer wall surface of a length of pipe work stock S (see FIG. 4). A cam element 39 preferably is threadedly secured in the radially outward end of clamping jaw base element 31 and is adapted to coactingly engage the frustoconical interior surface 41 of crowder element 27. A helical compression spring 43 is arranged in the interior of base element 31 and is operative for continuously urging coaxial base and plunger elements 31, 33 apart and for urging jaw unit 17 to an expanded disposition.

Each clamping jaw unit of the plurality of clamping jaw assemblies 15 is guidingly constrained in bidirectional movement radially of tubular frame 13. Concentrically fitted sleeve and bushing structure 45, 47 are fixedly secured radially on tubular frame 13 and define guideway structure for radially guidingly constraining each jaw unit 17; the base element 31 of each respective jaw unit 17 is slidably fitted in a respective bushing 47. A small, short guide pin 49 is radially fixed in the sleeve and bushing structure 45, 47 and is slidably received in guideway structure 51 formed in the base element 31 of jaw unit 17. The coacting guide pin and guideway structure 49, 51 permits longitudinal movement of the jaw unit while constraining it against rotation relative to the sleeve and bushing structure 45, 47. A helical compression spring 53 is convolutely fitted about each clamping jaw unit 17 and continuously urges the clamping jaw radially outwardly of tubular frame 13. Each spring 53 is interposedly tensioned between a spring seat portion 55 of frame 13 and an annular collar 57 concentrically fixed on the radially outward portion of clamping jaw base element 31.

Translational movement of crowder element 27 toward the right, as viewed in FIGS. 3 and 4, engages the frustoconical surface 41 of the crowder element with the respective cam surfaces 59 of clamping jaw units 17 and causes radial inward movement of the jaw units into the interior of tubular frame 13 and tensions the jaw unit retract springs 53. Movement of crowder unit 27 toward the left, as viewed in FIGS. 3 and 4, permits the retract springs 53 to urge the pipe-clamping jaw units 17 to a radially outward configuration and retracts the clamping jaw units from the interior of the tubular frame. It will be noted that the smaller the diameter of the pipe work stock, the greater will be the tensioning of the respective retract springs 53 of the pipe-clamping jaw assemblies. Also, it will be noted that the larger the diameter of the pipe work stock material, the sooner will the clamping surfaces 37 of the clamping jaw plunger elements 33 engage the exterior wall surface of the pipe stock as the crowder element 27 is moved into engagement with the clamping jaw units.

The plurality of cutting jaw assemblies is stationarily supported on an annular body 61 preferably in equiangular circumferential arrangement. Antifriction bearing means, preferably in the form of ball bearing race means 63, is interposedly concentrically arranged between annular body 61 and tubular frame 13. A thin, flat retainer ring 65 is fixedly secured by screw means 67 concentrically on the cutter head body 61 and prevents the displacement of bearing means 63 from the cutter head body structure. A large diametered ringlike retainer nut 69 is threadedly fitted over the terminal portion of tubular frame 13, and by engagement with ball bearing means 63, prevents axial displacement of the cutter head from the tubular frame. Oil seal ring means 71 is preferably fitted in annular body 61 and runningly engages the exterior periphery of retainer nut 69.

The cutting jaw unit 23 of each jaw assembly 21 includes a barlike core element 73 guidingly constrained in bidirectional, radial movement on cutter head body 61 by sleeve and bushing structure 75, 77. The cylindrical core element 73 is guidingly constrained in the bore opening 79 of bushing 77 and is radially displaceable inwardly and outwardly of the tubular interior of frame 13. A guide pin 81, fixedly secured in annular body 61, and projecting into the bore opening 79 of bushing structure 77 is received in a guideway groove 83 longitudinally extending in core element 73. The coacting guide pin and guideway structure 81, 83 respectively of annular body 61 and a respective core element 73 prevents lateral turning displacement of the core element while permitting longitudinal, axial movement thereof.

Cutting blade means, preferably in the form of a cutting wheel 85, is turnably supported on the radially inward end portion respectively of each core element 73 and on an axis 86 extending normal to the circular path of movement of the cutter head jaw assembles 21. Radially inward movement of each core element 73 and simultaneous converging radial movements of the plurality of cutter head jaw units 23 is operative for engaging the plurality of cutting wheels 85 with the length of pipe work stock S; radially converging movement of the cutting wheels 85 forms initially a groove in the pipe wall exterior and finally severs the length of pipe stock. A helical compression retract spring 87 is convolutely fitted about sleeve and bushing structure 75, 77 and continuously urges core element 73 to a radially outward disposition relative to cutter head annular body 61.

Cam surface means is supported on the radially outward end portions respectively of core elements 73, and through coacting engagement with frustoconical surface 41 of crowder element 27, is operative for causing inward, radial movement of the respective cutting jaw units 23. The cam surface means of each cutting jaw unit preferably includes a spherical cam bearing 89 turnably supported in bearing seat socket structure 91 cantilever supported on the radially outward end portion of respective core elements 73. The cam bearing and socket structure 89, 91 is supported on the distal end portion of a flattened bar member 93 cantilever supported from core element 73 by aperture structure 95 and pin means 97; the core element 73 is press fitted into the aperture structure 95 of bar member 93 and is fixedly secured by retainer pin structure 97 extending transversely through the core element 73 and bar member 93.

Electric motor means 25 preferably is stationarily supported on tubular frame 13 and communicates motion to cutter head 19 by drive line means indicated generally by numeral 99: A ring gear 101 is fixedly concentrically fitted on cutter head body 61 and is in driving engagement with a pinion gear 103 stationarily journaled from tubular frame 13 by shaft and pillow block means respectively 105, 107. A pair of meshing spur gears 109, 111 are fixedly secured respectively on motor output shaft 113 and shaft 105. Pinion gear 103 is fitted on a reduced end portion of shaft 105 and is fixedly secured to the shaft by transversely extending pin means 115. The shaft 105 loosely projects through an aperture 117 formed in crowder element 27 and permits free translational bidirectional movement of the crowder element and while shaft 105 is turning and drivingly rotating cutter head 19.

The crowder element 27 preferably is concentrically supported on tubular frame 13 by spline-bearing means indicated by numeral 119: The central portion of crowder element 27 includes annular flange structure 121 circumferentially arranged about tubular frame 13. A bushing-type slide bearing 123 is fixedly secured in the interior of aperture structure 121 and circumferentially, movably engages the cylindrical outer surface 125 of the tubular frame. Convergingly projecting, diametrically spaced guide pins 127 are fixedly secured in aperture flange structure 121 of crowder element 27. Guide pins 127 are freely runningly received in diametrically spaced, longitudinally extending guideways formed in tubular frame 13. The coacting guide pins 127 and guideways 129 permit translational bidirectional movement of the crowder element longitudinally along the tubular frame of the pipe-cutting apparatus while constraining the crowder element against rotational displacement about the frame.

The crowder-actuating lever 29 is adapted to be pivotally manipulated forwardly or rearwardly respectively for arranging the pipe-cutting apparatus in an active or inactive configuration. Pressing forwardly on crowder lever 27 is operative for radially, convergingly closing the clamping and cutting jaw units 17, 23 and for arranging the apparatus in a pipe-cutting configuration. Moving the crowder lever 29 rearwardly moves the frustoconical crowder element rearwardly and permits the retract springs 53, 87 respectively of the clamping and cutting jaw assemblies 15, 21 to retract the respective jaw units 17, 23 from the tubular interior of frame 13 and release a length of pipe work stock.

The crowder-actuating mechanism or the linkage means interconnecting crowder lever 29 with crowder element 27 preferably is fixedly secured in right-angular arrangement on one end of a pivot shaft 131 turnably secured in bearing block means 133 fixedly secured in a horizontal disposition by bolt means 135 and symmetrically subjacently on tubular frame 13. A pair of arm structures 137 are fixedly secured in lateral alignment on pivot shaft 131 and are arranged symmetrically on opposite sides of the tubular frame. Leftward and rightward arranged link members 139 and pin means 141, 143 articulatingly interconnect the lever arms 137 with the crowder element 27.

A deflector unit 145 preferably is concentrically fixed on the annular body 61 of cutter head 19 and is rotatingly driven with the cutter head. The deflector unit is generally of annular configuration and preferably is formed from sheet metal stock. It is generally V-shape in radial section and includes a frustoconical inner section 147 and a generally cylindrical outer skirt section 149. The deflector unit includes a circular flanged inner peripheral portion 151 adapted to be frictionally fixedly secured concentrically on annular body 61 of the cutter head. An adapter ring 153 is fixedly secured in a groove 155 formed in the annular end face of the cutter head body 61. The skirt portion 149 of the deflector unit is concentrically spaced in close arrangement about the cylindrical terminal portion 157 of crowder element 27 and provides guard or cover means for clamping jaw assemblies 15 and the cutter head jaw assemblies 21. The frustoconical interior section 147 of the deflector unit provides guide means for ready insertion of the pipe work stock material into the interior of tubular frame 13 and also provides means for deflecting a cutoff portion S' of a length of work stock S as it drops from the pipe-cutting apparatus after it is severed from the parent work stock material S'' (see FIG. 4). Electric pushbutton switch means 159 preferably is mounted on the distal end portion of crowder lever 29 and is connected by suitable circuitry to motor means 25; the switch means 159 is conveniently located on the crowder lever for starting and stopping rotation of the cutter head during the pipe-cutting procedure.

In using the pipe-cutting apparatus, the operator endwise inserts a length of pipe stock to be cut into the tubular interior of frame 13 and lengthwise positions the pipe stock cutoff location relative to the cutting wheels 85. The operator then pivotally moves crowder actuating lever 29 forwardly which, on initial forward movement of the lever, engages the clamping jaw units 17 with the pipe stock and compresses first spring 53 and then spring 43 of the pipe-clamping jaw assemblies 15. Continuing forward movement of the crowder lever further compresses the springs 43 of the clamping jaw units and convergingly move together the base and plunger elements 31, 33 of the respective clamping jaw units. Such actions progressively continue until the cutting wheels 85 engage the exterior cylindrical surface of the pipe stock and prevent further movement of the crowder lever. Pushbutton switch 159 may then be closed, thereby energizing motor means 25 and rotatingly driving cutter head 19. Maintaining continuous forward pressure on the crowder lever causes the cutter wheels 85 of the rotating cutter head 19 to form a circumferential groove about the pipe stock and with further pressure and forward movement of the crowder lever, the pipe stock is severed at the grooved portion formed by the cutter wheels (see FIG. 4). The crowder lever may then be released or moved rearwardly thereby permitting the retract spring members 53, 87 to move the clamping and cutting jaw members radially outwardly, thereby releasing the pipe stock material and permitting it to be withdrawn from the frame of the pipe-cutting apparatus.

It is contemplated that the pipe-cutting invention may be incorporated in a portable type pipe-cutting machine, and in such a machine suitable for pipe-cutting work in the field or at a location remote from a machine shop or the like. In the construction of a portable-type pipe-cutting machine embodying the invention, suitable handgrip means or laterally projecting leverage means, not shown, are secured on the tubular frame and provides means for manual manipulation and positioning of the machine.

While the instant invention has been shown and described herein in what is conceived to be the most practical and preferred embodiment, it is recognized that departures may be made therefrom within the scope of the invention.

What is claimed is:

1. Pipe-cutting apparatus comprising a tubular frame having an open end adapted for endwise receiving a length of pipe work stock; a plurality of pipe-clamping jaw assemblies stationarily supported in radial arrangement on said tubular frame, each jaw assembly including an axially resilient clamping jaw unit, means guidingly constraining said clamping jaw unit in bidirectional movement radially of said tubular frame, said clamping jaw unit having a radially endwardly arranged end having a clamping surface adapted for clamping engagement with the wall of a length of pipe work stock and having cam surface means supported on the radially outwardly arranged end of said clamping jaw unit, and including spring means yieldably urging said clamping jaw unit radially outwardly relative to said tubular frame; a cutter head including an annular body and a plurality of pipe cutting jaw assemblies supported on and intermittently arranged about the circular outer periphery of said annular body and with each cutting jaw assembly including a cutting jaw unit, means guidingly constraining said cutting jaw unit from said annular body and in bidirectional movement radially of said body, said cutting jaw unit including cutting blade means supported on the radially inwardly arranged end thereof and adapted for cutting engagement with the wall of a length of work stock and including cam surface means supported on the radially outwardly arranged end of said cutting jaw unit and including spring means yieldably urging said cutting jaw unit radially outward relative to said annular body; bearing means rotatingly supporting said cutter head coaxially on the open end of said tubular frame; motor means and motion-transmitting drive line means coactingly operative for rotatingly driving said cutter head; a crowder element having structure defining a central aperture and a generally frustoconical interior cam surface flaring outwardly from said central aperture; crowder bearing means supporting said crowder element coaxially of said tubular frame with said frustoconical cam surface thereof flaring outwardly toward said open end of said frame and substantially simultaneously engaging the cam surface means respectively of said clamping jaw units and cutting jaw units of said plurality of pipe-clamping assemblies and pipe-cutting assemblies, and including actuator means selectively operative for causing bidirectional movement of said crowder element axially of said tubular frame.

2. A pipe-cutting apparatus as set forth in claim 1 wherein said clamping jaw unit of each pipe-clamping jaw assembly includes a base element and a plunger element freely telescopically fitted together for axial expansive contractive movement and includes helical compression spring means operably interposedly fitted between said base and plunger elements for continuously urging said clamping jaw unit to an expanded disposition.

3. A pipe-cutting apparatus as set forth in claim 2 wherein said cam surface means of the clamping jaw unit of each pipe-clamping jaw assembly includes a spherical cam bearing and seat socket means supported on said clamping jaw base element and with said cam bearing being adapted for coacting engagement with the frustoconical interior cam surface of said crowder element.

4. A pipe-cutting apparatus as set forth in claim 1 wherein said blade means of the cutting jaw unit of each cutting jaw assembly is in the form of a cutter wheel mounted on an axis extending normal to the path of travel of the cutting jaw unit and with said wheel having a sharpened circular periphery adapted for metal-working engagement with the wall of the pipe work stock.

5. A pipe-cutting apparatus as set forth in claim 1 wherein said crowder bearing means is concentrically interposedly arranged between the structure defining the central aperture in said crowder element and the wall structure of said tubular frame.

6. A pipe-cutting apparatus as set forth in claim 5 wherein said motor means is supported on said tubular frame and said motion-transmitting means includes a ring gear concentrically fixed to the annular body of said cutter head, a pinion gear in driving engagement with said ring gear and a drive shaft extending through an opening formed in said crowder element and communicating motion from said motor means to said pinion gear.

* * * * *